United States Patent
Caretti et al.

(10) Patent No.: US 9,848,436 B2
(45) Date of Patent: Dec. 19, 2017

(54) METHOD FOR SCHEDULING RADIO RESOURCES

(71) Applicant: TELECOM ITALIA S.p.A., Milan (IT)

(72) Inventors: Marco Caretti, Turin (IT); Giovanni Nardini, Pisa (IT); Dario Sabella, Turin (IT); Giovanni Stea, Pisa (IT); Antonio Virdis, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 121 days.

(21) Appl. No.: 14/787,343

(22) PCT Filed: May 8, 2014

(86) PCT No.: PCT/EP2014/059419
§ 371 (c)(1),
(2) Date: Oct. 27, 2015

(87) PCT Pub. No.: WO2014/180940
PCT Pub. Date: Nov. 13, 2014

(65) Prior Publication Data
US 2016/0113028 A1  Apr. 21, 2016

(30) Foreign Application Priority Data

May 9, 2013  (IT) .............. MI2013A0756

(51) Int. Cl.
*H04J 3/00* (2006.01)
*H04W 72/12* (2009.01)
(Continued)

(52) U.S. Cl.
CPC .......... *H04W 72/121* (2013.01); *H04B 7/04* (2013.01); *H04W 16/10* (2013.01); *H04W 72/0446* (2013.01); *H04W 84/042* (2013.01)

(58) Field of Classification Search
CPC .......... H04W 72/121; H04W 72/0446; H04W 84/042; H04W 16/10; H04B 7/04
(Continued)

(56) References Cited

U.S. PATENT DOCUMENTS

2005/0169229 A1  8/2005  Cho et al.
2010/0317364 A1 * 12/2010  Zhang .................. H04W 16/04
                                                              455/452.2
(Continued)

FOREIGN PATENT DOCUMENTS

EP        1 549 093        6/2005
JP   WO 2010025953 A1 *  3/2010 ........... H04L 5/0037
(Continued)

OTHER PUBLICATIONS

International Search Report and Written Opinion of the International Searching Authority dated Jul. 7, 2014 in PCT/EP14/059419 Filed May 8, 2014.

*Primary Examiner* — Mang Yeung
(74) *Attorney, Agent, or Firm* — Oblon, McClelland, Maier & Neustadt, L.L.P.

(57) ABSTRACT

A method for allocating resource blocks of a transmission frame on a cellular network. The cellular network includes a cluster of antennas and a master unit of the cluster. Each antenna of each cluster is configured to provide radio coverage over a corresponding cell to exchange data with corresponding user equipment in communication with the antenna. During the transmission frame the antennas of the cluster are configured to be selectively activated and muted according to a plurality of cluster muting conditions.

11 Claims, 8 Drawing Sheets

(51) Int. Cl.
*H04W 16/10* (2009.01)
*H04B 7/04* (2017.01)
*H04W 72/04* (2009.01)
*H04W 84/04* (2009.01)

(58) Field of Classification Search
USPC .......................................................... 370/336
See application file for complete search history.

(56) References Cited

U.S. PATENT DOCUMENTS

2011/0222496 A1    9/2011  Zhou et al.
2012/0224650 A1    9/2012  Zhang et al.

FOREIGN PATENT DOCUMENTS

KR          EP 1549093 A2 *  6/2005   ........... H04L 5/0007
WO          2010 025953      3/2010

\* cited by examiner

METHOD FOR SCHEDULING RADIO RESOURCES

BACKGROUND OF THE INVENTION

Field of the Invention

The present invention generally relates to wireless communication networks, such as cellular networks. More particularly, the present invention relates to cellular networks based on OFDM (Orthogonal Frequency Division Multiplexing) access schemes, such as LTE (Long Term Evolution)/LTE-A(dvanced) technology and their evolutions, and to a method for efficiently scheduling radio resources on such wireless networks.

Description of the Related Art

Evolution of cellular networks has experimented a significant growth in terms of spread and performance, and has recently brought to 3GPP ("Third Generation Partnership Project) LTE/LTE-A standard.

3GPP LTE/LTE-A standard is conceived for allowing data to be high-speed conveyed between a fixed-location transceiver base station or node (e.g., eNodeB—evolved NodeB) comprising antennas each radiating radio waves over a respective area—thus defining a so-called cell—and UE (User Equipments, e.g., user terminals, such as mobile phones) within such cell and in communication with said antennas.

A very important issue to be faced in multi-cell cellular networks is the inter-cell interference. Inter-cell interference mainly occurs when a UE is located at or near the border of two adjacent cells, so that the UE, despite being in communication (receiving/transmitting data) with one antenna of a base station, perceives radio signals radiated from one or more different antennas of the same base station or different base stations. In this situation, a mechanism of transmission/reception coordination between neighboring cells is required.

Several physical-layer and MAC-layer approaches are known in the art for facing the inter-cell interference issue.

For example, "Enhancing Cell-Edge Performance: A Downlink Dynamic Interference Avoidance Scheme with Inter-Cell Coordination" by Mahmudur Rahman, and Halim Yanikomeroglu, IEEE Transactions on Wireless Communications, vol. 9, no. 4, pp. 1414-1425, April 2010, discloses an interference management scheme comprised of two separate algorithms residing at the base station and at a central entity. Based on the interference received by its user terminals and their service status, each sector (via its base station) sends a request to the central controller; this request incorporates a tentative list of chunks to be restricted at the surrounding dominant interferer sectors. This request also includes the utility measure of the chunks in the requesting sector. The central controller gathers all such requests and processes to prepare a refined list of chunk restrictions to be applied in all involved sectors in different cells. The central controller sends the restriction decision to all involved sectors. The restriction process is refreshed from time to time within an interval which is shorter than the channel coherence time. Scheduler takes the restriction decision into consideration.

SUMMARY OF THE INVENTION

The Applicant has found that the solutions known in the art are not efficient, since they are not capable of dynamically adapting to the traffic load of each single antenna, nor of optimizing the amount of resources an antenna may exploit. Moreover, known solutions do not take into account limitations given by the amount of information which is possible to exchange among the elements involved in the transmission/reception coordination mechanism.

The interference management scheme proposed by Mahmudur Rahman and Halim Yanikomeroglu is not efficient since each antenna has to communicate to the central controller also the data rate that has to be reached on each radio resource block, in case the restriction requests are accepted. Moreover, although according to this scheme the central controller is capable of resolving possible conflicts arising from requests coming from different antennas, deciding which restriction requests are to be accepted or refused, the central controller is not capable of modifying the radio resource blocks allocation communicated thereto by the antennas. Furthermore, after the resolutions of the conflicts, the antennas cannot adapt the previously determined tentative allocations to the restrictions set by the central controller.

In view of the state of the art outlined in the foregoing, the Applicant has faced the problem of how to provide a radio resources scheduling in a wireless communication network comprising clusters of antennas, which radio resource scheduling is capable of dynamically adapting the radio resource block allocation to the traffic load requests coming from each antenna of the clusters.

An aspect of the present invention relates to a method for allocating resource blocks of a transmission frame on a cellular network comprising a cluster of antennas and a master unit of said cluster. Each antenna of each cluster is configured to provide radio coverage over a corresponding cell to exchange data with corresponding user equipment in communication with said antenna. During the transmission frame, the antennas of the cluster are configured to be selectively activated and muted according to a plurality of cluster muting conditions. The method comprises, at each antenna of a cluster:

a) subdividing the transmission frame into a plurality of interference sub-bands each one corresponding to a cluster muting condition of the plurality and each one comprising a respective set of resource blocks of the transmission frame, and b) calculating a respective resource block allocation proposal providing for each cluster muting condition in which said antenna is active a number of resource blocks requested by said antenna to be assigned to the interference sub-band corresponding to said cluster muting condition;

The method further comprises, at the master unit of said cluster:

c) collecting the resource block allocation proposals of the antennas of the cluster;

d) checking if said resource block allocation proposals are mutually compatible within the transmission frame;

e) adjusting the resource block allocation proposals in case said resource block allocation proposal are not mutually compatible within the transmission frame, said adjusting comprising reducing the number of resource blocks requested by each antenna to be assigned to the interference sub-bands until they become mutually compatible within the transmission frame, and f) partitioning the transmission frame by setting the number of resource blocks of each interference sub-band based on the resource block allocation proposals.

The method still further comprises, at each antenna of said cluster:
  g) allocating to the user equipment corresponding resource blocks of the transmission frame based on the transmission frame partitioning carried out by the master unit.

According to an embodiment of the present invention, said calculating a respective resource block allocation proposal comprises calculating an amount of data the corresponding user equipment may exchange with the antenna in a resource block during the cluster muting conditions of the plurality, and accordingly calculating the respective resource block allocation proposal based on said calculated amount of data.

According to an embodiment of the present invention, said calculating the amount of data the user equipment may exchange with the antenna in a resource block comprises inferring the amount of data through channel quality indicators provided by the user equipment, said channel quality indicators being indicative of the communication quality of wireless channels of the cell.

According to an embodiment of the present invention, said checking if the resource block allocation proposals are mutually compatible within the transmission frame comprises verifying for each antenna of the cluster that a number of resource blocks requested by said antenna plus a number of resource blocks that said antenna can not use, having to be muted, derived from the requests coming from other antennas does not exceed a total number of resource blocks forming the frame, and verifying that an overall number of resource blocks that is needed for satisfying all the requests from all the antennas of the cluster corresponding to cluster muting conditions in which at least one of the antenna of the cluster is muted does not exceed the total number of resource blocks forming the frame.

According to an embodiment of the present invention, said partitioning the transmission frame comprises, if for each antenna of the cluster it is possible to satisfy the resource block allocation proposal of the antenna and the requests from the other antennas of the cluster corresponding to cluster muting conditions in which said antenna has to be muted, granting to said antenna the possibility of allocating the corresponding resource blocks in a way that improves the interference condition experienced by the user equipment in communication therewith over the requests of said antenna.

According to an embodiment of the present invention, said partitioning the transmission frame prioritizes the assignment of resource blocks to the interference sub-bands corresponding to cluster muting conditions in which the number of muted antennas is higher over the interference sub-bands corresponding to cluster muting conditions in which the number of muted antennas is lower.

According to an embodiment of the present invention, said partitioning the transmission frame is carried out if the cellular network is arranged so that the antennas of the cluster are distributed on different sites and insist on a same area.

According to an embodiment of the present invention, said partitioning the transmission frame prioritizes the assignment of resource blocks to the interference sub-bands corresponding to cluster muting conditions in which the number of muted antennas is lower over the interference sub-bands corresponding to cluster muting conditions in which the number of muted antennas is higher.

According to an embodiment of the present invention, said partitioning the transmission frame is carried out if the cellular network is arranged so that the antennas of the cluster are co-located at a same site and insist on a separate areas.

According to an embodiment of the present invention, said cluster of antennas comprises three antennas j=A, B, C, and said partitioning the transmission frame comprises maximizing $\{\alpha \cdot (n(A)+n(B)+n(C))+(n(AB)+n(BC)+n(AC))\}$ subject to:

$$n(BC) \geq N(A)(BC)$$

$$n(BC)+n(C) \geq N(A)(BC)+N(A)(C)$$

$$n(BC)+n(B) \geq N(A)(BC)+N(A)(B)$$

$$n(BC)+n(B)+n(C)+n(0)=N(A)(BC)+N(A)(C)+N(A)(B)+N(A)(0)$$

$$n(AC) \geq N(B)(AC)$$

$$n(AC)+n(C) \geq N(B)(AC)+N(B)(C)$$

$$n(AC)+n(A) \geq N(B)(AC)+N(B)(A)$$

$$n(AC)+n(A)+n(C)+n(0)=N(B)(AC)+N(B)(C)+N(B)(A)+N(B)(0)$$

$$n(AB) \geq N(C)(AB)$$

$$n(AB)+n(A) \geq N(C)(AB)+N(C)(A)$$

$$n(AB)+n(B) \geq N(C)(AB)+N(C)(B)$$

$$n(AB)+n(A)+n(B)+n(0)=N(C)(AB)+N(C)(C)+N(C)(A)+N(C)(0)$$

$$n(BC)+n(AC)+n(AB)+n(B)+n(C)+n(A)+n(0) \leq N\text{tot},$$

wherein:
  $\alpha$ is a parameter that is higher than one if the partitioning is carried out according to point 1), and is lower than one if the partitioning is carried out according to point 2) of, and
  $n(K)$ is the size, in terms of resource blocks, of the interference sub-band corresponding to the cluster muting condition K, and $N(j)(K)$ is the size, in term of resource block, of the resource block allocation proposal requested by the antenna j to be assigned to the interference sub-band corresponding to the cluster muting condition K, wherein:
  K=0 corresponds to the cluster muting condition in which all the three antennas A, B, C of the cluster are activated;
  K=A corresponds to the cluster muting condition in which antenna A is deactivated, antennas B and C are activated;
  K=B corresponds to the cluster muting condition in which antenna B is deactivated, antennas A and C are activated;
  K=C corresponds to the cluster muting condition in which antenna C is deactivated, antennas A and B are activated;
  K=AB corresponds to the cluster muting condition in which antennas A and B are deactivated, antenna C is activated;
  K=BC corresponds to the cluster muting condition in which antennas B and C are deactivated, antenna A is activated;
  K=AC corresponds to the cluster muting condition in which antennas A and C are deactivated, antenna B is activated.

Another aspect of the present invention relates to a system for allocating resource blocks of a transmission frame on a cellular network comprising at least a cluster of antennas, wherein each antenna of each cluster is configured to provide radio coverage over a corresponding cell to exchange data with corresponding user equipment in communication with said antenna, and wherein during the transmission frame the antennas of the cluster are configured to be selectively activated and muted according to a plurality of cluster muting conditions. Each antenna of the cluster is configured to:
 a) subdivide the transmission frame into a plurality of interference sub-bands each one corresponding to a cluster muting condition of the plurality and each one comprising a respective set of resource blocks of the transmission frame, and
 b) calculate a respective resource block allocation proposal providing for each cluster muting condition in which said antenna is active a number of resource blocks requested by said antenna to be assigned to the interference sub-band corresponding to said cluster muting condition;

The system comprises a master unit of said cluster, which is configured to:
 c) collect the resource block allocation proposals of the antennas of the cluster;
 d) check if said resource block allocation proposals are mutually compatible within the transmission frame;
 e) adjust the resource block allocation proposals in case said resource block allocation proposal are not mutually compatible within the transmission frame, said adjusting comprising reducing the number of resource blocks requested by each antenna to be assigned to the interference sub-bands until they become mutually compatible within the transmission frame, and
 f) partition the transmission frame by setting the number of resource blocks of each interference sub-band based on the resource block allocation proposals.

Each antenna of said cluster is further configured to:
 g) allocate to the user equipment corresponding resource blocks of the transmission frame based on the transmission frame partitioning carried out by the master unit.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Hereinafter, with the term "antenna", it will be intended any radiating apparatus equipped with processing capabilities and one or more physical antennas. With this assumption, an antenna may correspond to a CoMP (Coordinated Multi-Point) transmission point (as per 3GPP definitions).

Figure 1B:
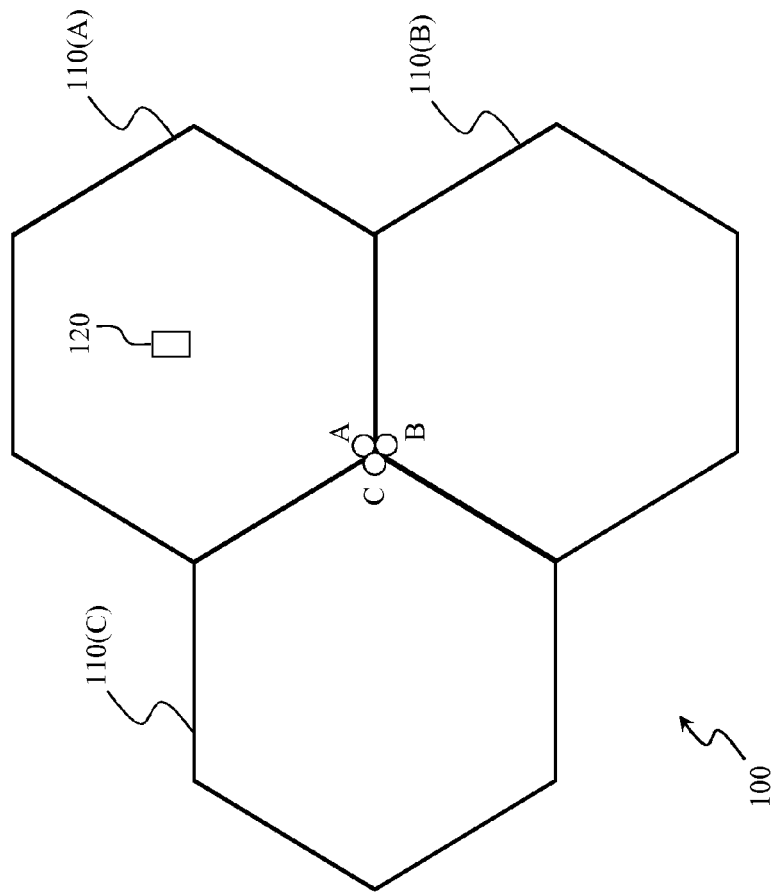
FIG. 1B schematically illustrates a second exemplary network arrangement in which the concepts according to an embodiment of the present invention can be applied.
Figure 1A:
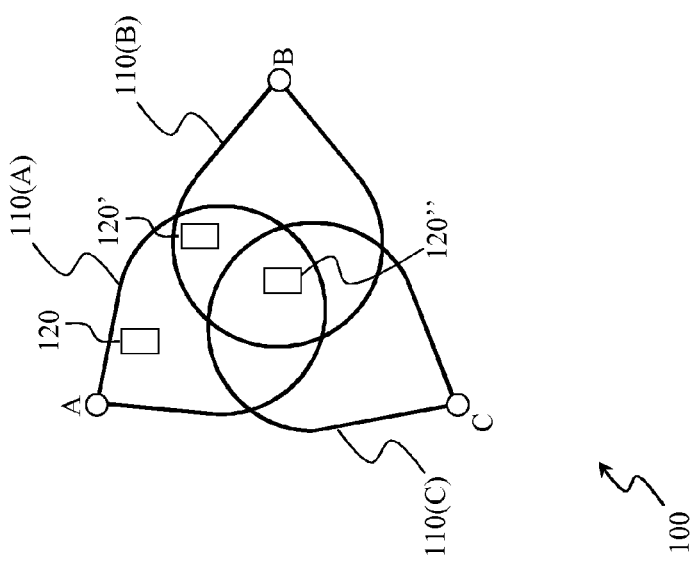
FIG. 1A schematically illustrates a first exemplary network arrangement in which the concepts according to an embodiment of the present invention can be applied.

With reference to the drawings, FIGS. 1A and 1B schematically illustrate a first and a second exemplary network arrangements, respectively, in which the concepts according to an embodiment of the present invention can be applied. FIGS. 1A and 1B schematically illustrate a portion of a cellular network 100 (e.g., complying with the 3GPP LTE/LTE-A standard) which comprises a plurality of transceiver base stations (only one of which being illustrated), each one comprising a set of (e.g., three) antennas A, B, C configured to provide radio coverage over a corresponding area (cell) 110(A), 110(B), 110(C), for allowing User Equipment (UE) 120 (e.g., mobile phones) within the cell 110(A), 110(B), 110(C) to exchange data (e.g., originating from web browsing, e-mailing, voice, or multimedia data traffic). In the network arrangement illustrated in FIG. 1A, the antennas A, B, C of a transceiver base station are distributed on different sites, and insist on the same area, whereas in the network arrangement illustrated in FIG. 1B the antennas A, B, C of a transceiver base station are co-located at a same site, and substantially insist on separated areas.

The data transmission in cellular network 100 is based on Orthogonal Frequency Division Multiplexing (OFDM) technique, where radio resources are allocated in time/frequency domain. Considering for example the 3GPP LTE/LTE-A standard, downlink and uplink transmissions are carried out based on transmission frames of 10 ms duration. In time domain, radio resources are distributed every Transmission Time Interval (TTI), each one lasting 1 ms (sub-frame) and comprising two time slots of 0.5 ms, whereas in frequency domain the whole bandwidth is divided into a plurality of 180-kHz sub-channels (each one corresponding to N=12 adjacent and equally spaced sub-carriers). A radio resource comprising a number of OFDM symbols (e.g., seven) spanning over one time slot in time domain and twelve adjacent sub-carriers in frequency domain is referred to as RB ("Resource Block"), and corresponds to the smallest radio resource that can be allocated to a UE 120 for data transmission.

During each frame, each one among the antennas A, B and C of a transceiver base station is configured to allocate RBs of the frame to corresponding UE 120 within its respective cell 110(A), 110(B), 110(C) and in communication with the antenna, in such a way to transmit/receive data to/from such UE 120 by exploiting said RBs. A same RB may be allocated by more than one of the antennas A, B, C to their respective UE 120. For example, a same RB may be allocated by the antenna A for transmitting/receiving data to/from a UE 120 in the cell 110(A) and in communication with antenna A, and at the same time by the antenna B for transmitting/receiving data to/from a UE 120 in its cell 110(B) and in communication with the antenna B. However, allocating same RBs by different antennas A, B, C may cause interference degrading the performance of the cellular network 100, especially for those UE 120 located in the interference-prone areas of the network 100, such as at or near the edges of the cells 110(A), 110(B), 110(C) thereof. Depending on the mutual position among UE and antennas, as well as on the considered network arrangement, different inter-cell interference scenarios may occur.

For example, making reference to the exemplary network arrangement illustrated in FIG. 1A, and assuming that the UE identified with the references 120, 120' and 120" are all in communication with the antenna A:

- UE 120 is significantly closer to the antenna A than to the antennas B and C. In this case, if the antenna A allocates thereto a RB that is at the same time being allocated by, e.g., the antenna B to another UE (not illustrated) in communication with the antenna B, the transmission from/to the antenna A to/from the UE 120 exploiting said RB occurs without (or at least with very low) inter-cell interference. UE 120 is said to be in a low interference condition.
- UE 120' is in a location at the intersection between the cells 110(A), 110(B), and thus the distance between the antenna A and UE 120' is comparable to the distance between the antenna B and the same UE 120'. UE 120' is relatively far from the antenna C. In this case, if the antenna A allocates to the UE 120' a RB that is at the same time being allocated by the antenna B to another UE (not illustrated) in communication therewith, the transmission from/to the antenna A to/from the UE 120' exploiting said RB is affected by inter-cell interference (signals transmitted by antenna B disturb the communications of UE 120' and antenna A). On the contrary, if the antenna A allocates thereto a RB that is at the same time being allocated by the antenna C to another UE (not illustrated) in communication therewith, the transmission from/to the antenna A to/from the UE 120' exploiting said RB occurs without (or at least with very low) inter-cell interference (signals transmitted by antenna C do not disturb the communications of UE 120' and antenna A). UE 120' is said to be in a high interference condition with respect to the antenna B. A similar situation occurs for a UE that happens to be located astride cells 110(A) and 110(C).
- UE 120" is in a location at the intersection between the cells 110(A), 110(B) and 110(C), and thus the distance between the antenna A and UE 120" is comparable to the distance between the antenna B and UE 120", and to the distance between the antenna C and UE 120". In this case, if the antenna A allocates to the UE 120" a RB that is at the same time being allocated by the antenna B or by the antenna C to another UE (not illustrated) in communication with antenna B or C, respectively, the transmission from/to the antenna A to/from the UE 120" exploiting said RB is affected by inter-cell interference (signals transmitted by antenna B or antenna C disturb the communications of UE 120" and antenna A). UE 120" is said to be in a high interference condition with respect to both the antenna B and the antenna C.

Figure 2:
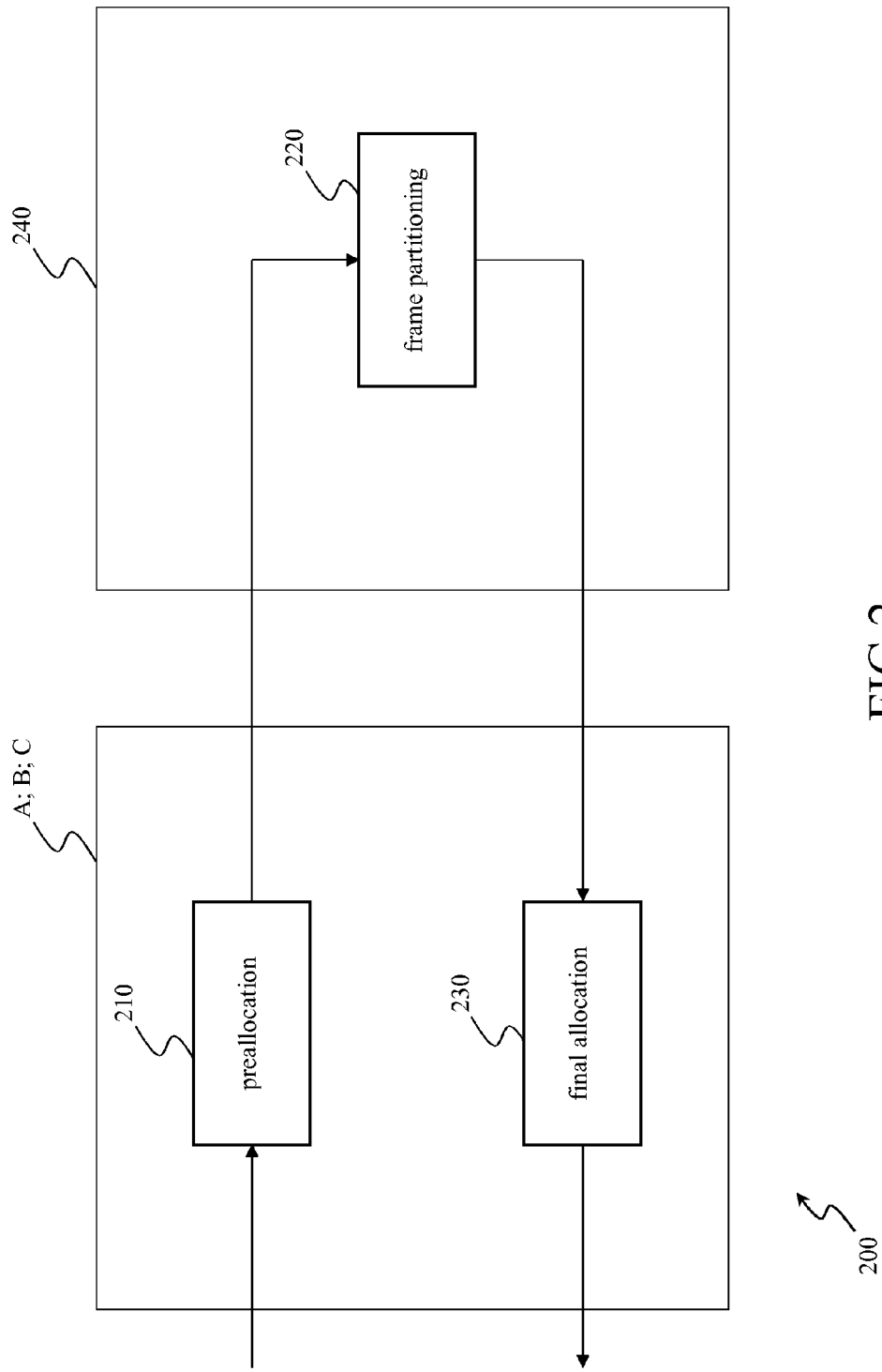
FIG. 2 illustrates in terms of functional blocks the main operations of a scheduling procedure for allocating radio resources on the cellular network of FIG. 1A or FIG. 1B according to an embodiment of the present invention.

FIG. 2 illustrates in terms of functional blocks the main operations of a scheduling procedure 200 for allocating radio resources on the cellular network 100 according to an embodiment of the present invention, in such a way to improve the channel quality—and thus its throughput—for the UE in high interference conditions, without significantly penalizing the UE in low interference conditions, and without significantly reducing the cell capacity.

By defining with the term "cluster of antennas" a set of antennas that are coordinated in the transmission towards a set of UE, for each cluster of antennas A, B, C of a transceiver base station, and for each frame, the scheduling procedure 200 dynamically coordinates the activation/deactivation, during portions of the frame, of the three antennas A, B, C and the way the RBs of the frame are allocated thereamong.

The activation/deactivation of the antennas of the cluster is carried out by selecting one among a set of so-called cluster muting conditions K. Making reference to the considered case, in which the cluster includes three antennas A, B, C, the possible cluster muting conditions K are:

- K=0: all the three antennas A, B, C of the cluster are activated (no-muting condition);
- K=A: antenna A is deactivated, antennas B and C are activated (single-muting condition);
- K=B: antenna B is deactivated, antennas A and C are activated (single-muting condition);
- K=C: antenna C is deactivated, antennas A and B are activated (single-muting condition);
- K=AB: antennas A and B are deactivated, antenna C is activated (double-muting condition);
- K=BC: antennas B and C are deactivated, antenna A is activated (double-muting condition);
- K=AC: antennas A and C are deactivated, antenna B is activated (double-muting condition).

As will be described in greater detail in the following of the present description, the scheduling procedure 200 according to an embodiment of the present invention provides for dynamically subdividing each frame into a plurality of interference sub-bands ISB(K), each one corresponding to a cluster muting condition K. Each interference sub-band ISB(K) comprises a respective set of RBs of the frame, to be allocated according to the corresponding cluster muting condition K.

The scheduling procedure 200 according to an embodiment of the present invention comprises three main sub-procedures, and namely a pre-allocation sub-procedure 210, a frame partitioning sub-procedure 220 and a final allocation sub-procedure 230. These three sub-procedures are reiterated every period of time corresponding to one or more transmission frames.

According to an embodiment of the present invention, while the pre-allocation sub-procedure 210 and the final allocation sub-procedure 230 are locally, autonomously and independently carried out by each antenna of the cluster, the frame partitioning sub-procedure 220 is carried out by a common master unit 240, for example co-located at one among the antennas of the cluster, or a unit distinct from the antennas.

At the beginning of the pre-allocation sub-procedure 210, each antenna A, B, C of the cluster calculates the amount of data BpB(K) (e.g., number of bytes) that each UE 120 may exchange (both in uplink and in downlink) with the antenna in a RB, in the various muting conditions K assumed by the cluster of antennas A, B, C.

As an example, the BpB(K) values can be inferred through the Channel Quality Indicators (CQI) (indicative of the communication quality of the wireless channels of the cell 110(A), 110(B), 110(C)) sent by the UE 120 during former time instants, can be set as default values by the antenna, or can be inferred through measurements of various kinds.

Based on the received BpB(K), each antenna A, B, C calculates a respective resource allocation proposal, by estimating how to assign each of its UE 120 to a selected interference sub-band ISB(K) of the frame, and then, based on said estimated assignments, by estimating the size of each interference sub-band ISB(K) (in terms of number of RBs to be used for serving the UE in the different cluster muting conditions K). The resource allocation proposals carried out by the various antennas A, B, C of the cluster are sent to the master unit 240, which carries out the frame partitioning sub-procedure 220.

The frame partitioning sub-procedure 220 provides for checking if the resource allocation proposals received from the antennas A, B, C are compatible. In the negative case, the requests are adjusted to make the frame partition feasible. At this point, the frame partitioning sub-procedure 220 calculates the effective size (in terms of number of RBs) of each interference sub-band ISB(K) of the frame, communicating the result to the antennas A, B, C.

Then, each antenna A, B, C of the cluster carries out the final allocation sub-procedure 230, allocating to each of its UE 120 corresponding RBs based on the interference sub-bands ISB(K) calculated in the frame partitioning sub-procedure 220.

Figure 3:
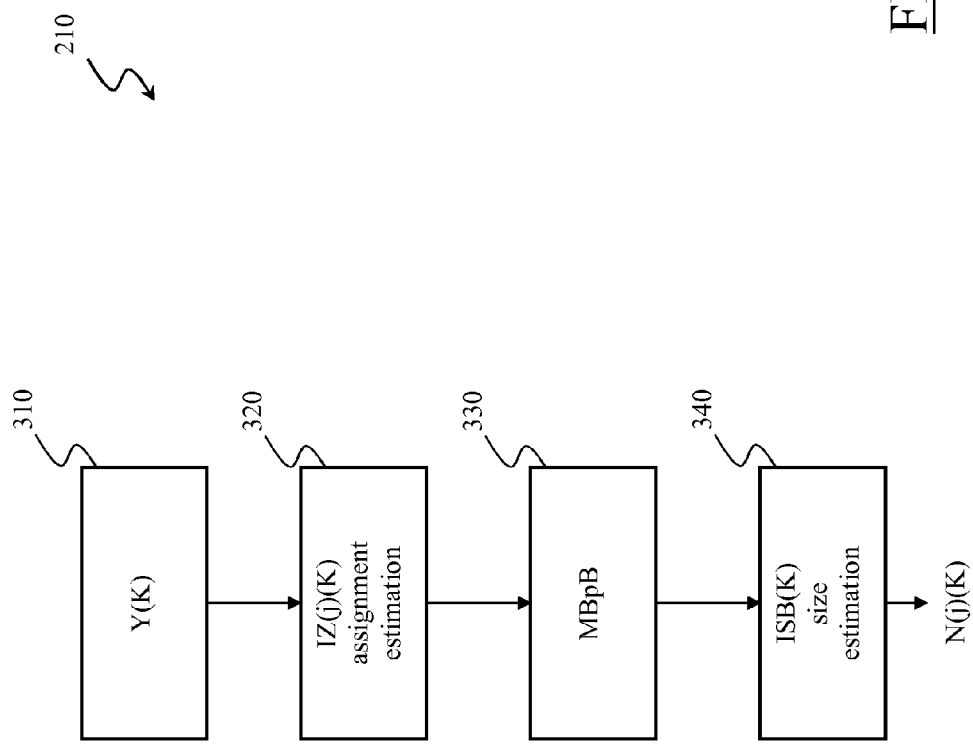
FIG. 3 illustrates in terms of functional blocks the main phases of a preallocation sub-procedure of the scheduling procedure of FIG. 2.

FIG. 3 illustrates in terms of functional blocks the main phases of the pre-allocation sub-procedure 210 according to an embodiment of the present invention.

Each antenna A, B, C of the cluster calculates the BpB(K) values for the respective served UE 120. In the example considered, wherein the cluster includes three antennas A, B, C, each UE 120 is associated to four corresponding BpB(K) values. Considering for example the antenna A, each UE 120 is associated to the following BpB(K) values:

BpB(0), providing the number of bytes that said UE 120 can exchange with antenna A in a RB when also the other two antennas B and C are activated;

BpB (B), providing the number of bytes that said UE 120 can exchange with antenna A when the antenna B is deactivated (muted) and the antenna C is activated;

BpB (C), providing the number of bytes that said UE 120 can exchange with the antenna A when the antenna C is deactivated (muted) and the antenna B is activated; and BpB (BC), providing the number of bytes that said UE 120 can exchange with the antenna A when both the antenna B and the antenna C are deactivated (muted).

For each antenna of the cluster, and for each UE 120 served by said antenna, the pre-allocation sub-procedure 210 calculates (block 310) a corresponding set of gain parameters Y(K), each one indicating the gain—in terms of amount of data that can be transmitted from said antenna to said the served UE 120—obtainable with a corresponding cluster muting condition K in which at least one among the other antennas of the cluster is deactivated (muted), compared to the case in which all the antennas of the cluster are activated. Making for example reference to the antenna A, the following three gain parameters Y(K) are calculated for each UE 120 associated to the cell 110(A):

$$Y(B)=(BpB(B)/BpB(0));$$

$$Y(C)=(BpB(C)/BpB(0));$$

$$Y(BC)=(BpB(BC)/BpB(0)).$$

Y(B) is the gain—in terms of amount of data that can be transmitted from antenna A to the UE 120—obtainable by having the antenna B deactivated and the antennas A and C activated with respect to the case in which all the antennas A, B, and C are all active.

Y(C) is the gain—in terms of amount of data that can be transmitted from antenna A to the UE 120—obtainable by having the antenna C deactivated and the antennas A and B activated with respect to the case in which all the antennas A, B, and C are all active.

Y(BC) is the gain—in terms of amount of data that can be transmitted from antenna A to the UE 120—obtainable by having the antennas B and C deactivated and the antenna A and B activated with respect to the case in which all the antennas A, B, and C are all active.

According to an embodiment of the present invention, for each antenna j=A, B, C of the cluster and for each UE 120 served by said antenna j, the next phase of the pre-allocation sub-procedure 210 (block 320) provides for comparing the corresponding gain parameters Y(K) with (a) predetermined threshold value(s), for example two threshold values th' and th", and accordingly estimating in which one among a plurality of interference zone groups IZ(j)(K)—each corresponding to a corresponding cluster muting condition K—said UE is assigned to.

Making again reference to the antenna A, according to an embodiment of the present invention, the interference zone groups IZ(A)(K) assignment estimation of the generic UE 120 is carried out according to the following algorithm:

if (Y(BC)>th')→UE assigned to IZ(A)(BC)
else if (Y(B)>th" && Y(C)<th")→UE assigned to IZ(A) (B)
else if (Y(B)<th" && Y(C)>th")→UE assigned to IZ(A) (C)
else if (Y(B)>th" && Y(C)>th") {
  if (Y(B)>Y(C))→UE assigned to IZ(A)(B)
  else→UE assigned to IZ(A)(C)
} else→UE assigned to IZ(A)(0)

Similar considerations apply if the assignment of the UE to the various interference zone groups IZ(j)(K) is carried out in different ways, using different algorithms.

Then (block 330), for each UE 120, a corresponding Modified BpB(k) MBpB is set to the value of the BpB (K) corresponding to the interference zone group IZ(j)(K) the UE 120 has been assigned to.

At this point (block 340), each antenna A, B, C of the cluster provides a respective estimate of the size of the interference sub-bands ISB(K) of the frame by exploiting a known resource allocation algorithm (such as for example the PF (Proportional Fair) or the max C/I) based on the MBpB values calculated at block 330.

At the end of the pre-allocation sub-procedure 210, each antenna j=A, B, C of the cluster outputs a corresponding resource allocation proposal, including, for each cluster muting condition K in which the antenna j is active, a corresponding sub-band size request N(j)(K). Each sub-band size request N(j)(K) indicates the number of RBs requested by the antenna j of the cluster to be assigned to the interference sub-band ISB(K) of the frame.

Figure 4:
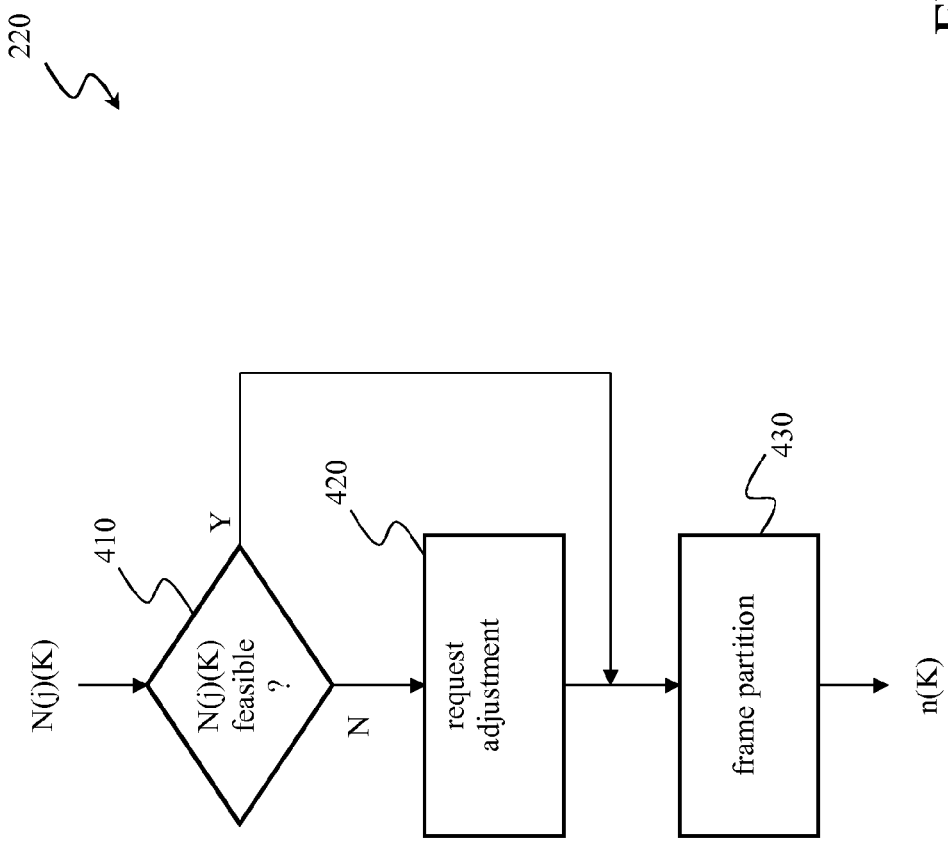
FIG. 4 illustrates in terms of functional blocks the main phases of a frame partitioning sub-procedure of the scheduling procedure of FIG. 2 according to an embodiment of the present invention.

FIG. 4 illustrates in terms of functional blocks the main phases of the frame partitioning sub-procedure 220 according to an embodiment of the present invention.

The master unit 240 collects from the antennas A, B, C of the cluster the various resource allocation proposals (i.e., the sub-band size requests N(j)(K)) calculated in the pre-allocation sub-procedure 210.

The first phase of the frame partitioning sub-procedure 220 (block 410) provides for checking if the received sub-band size requests N(j)(K) are feasible, i.e., if they are mutually compatible within the same frame. For this purpose, according to an embodiment of the present invention, the master unit 240 verifies for each antenna j of the cluster that the number of RBs requested by such antenna j, plus the number of RBs that antenna j can not use (having to be muted) derived from the requests coming from the other antennas of the cluster does not exceed the total number Ntot of RBs forming the frame.

For example, making reference to the example at issue, wherein the cluster of antennas includes three antennas j=A, B, C, said checks are made by verifying the following inequalities IN(i) (i=1, 2, 3):

$$N(A)(0)+N(A)(B)+N(A)(C)+N(A)(BC)+\max\{N(B)(A),\\N(C)(A)\}+N(B)(AC)+N(C)(AB) \leq N\text{tot} \quad \text{IN(1)}$$

$$N(B)(0)+N(B)(A)+N(B)(C)+N(B)(AC)+\max\{N(A)(B),\\N(C)(B)\}+N(A)(BC)+N(C)(AB) \leq N\text{tot} \quad \text{IN(2)}$$

$$N(C)(0)+N(C)(A)+N(C)(B)+N(C)(AB)+\max\{N(A)(C),\\N(B)(C)\}+N(B)(AC)+N(C)(AB) \leq N\text{tot} \quad \text{IN(3)}$$

Moreover, the master unit 240 calculates an overall number of RBs that is needed for satisfying the requests from all the antennas of the cluster of muting at least one of the antennas; the master unit then verifies that said calculated overall number does not exceed the total number Ntot of RBs forming the frame. In the considered example, the following inequality IN(i) (i=4) is verified:

$$\max\{N(A)(C),N(B)(C)\}+\max\{N(A)(B),N(C)(B)\}+\\\max\{N(B)(A),N(C)(A)\}+N(A)(BC)+N(B)(AC)+N(C)(AB) \leq N\text{tot}. \quad \text{IN(4)}$$

If the received sub-band size requests N(j)(K) are not feasible (exit branch N of block 410), i.e., if at least one among the inequalities IN(i) is not verified, the frame partitioning sub-procedure 220 provides for carrying out a request adjustment phase 420 directed to adjust said sub-band size requests N(j)(K) to make them feasible. In case the received sub-band size requests N(j)(K) are feasible (exit branch Y of block 410), i.e., if all the inequalities IN(i) are verified, or after the completion of the request adjustment phase 420, the frame partitioning sub-procedure 220 provides for carrying out a frame partition phase 430 which sets the effective size (in terms of number of PRBs) of each interference sub-band ISB(k).

The request adjustment phase 420 according to an embodiment of the present invention provides for reducing the sub-band size requests N(j)(K) by progressively removing RBs from sub-band size requests N(j)(K) until they become feasible, without penalizing any particular set of UE 120 or any particular antenna A, B, C of the cluster.

For each one of the non-verified inequalities IN(i), the request adjustment phase 420 provides for calculating a corresponding overflow value OV(i), defined as the difference (in terms of RBs) between the left hand side and the right hand side of said inequality IN(i). A maximum overflow value MOV is set equal to the highest one among the calculated overflow values OV(i).

Then, the request adjustment phase 420 provides for identifying which are the sub-band size requests N(j)(K) that most frequently appear in the non-verified inequalities IN(i). Such sub-band size requests N(j)(K) will be now referred to as "target elements". For example, according to an embodiment of the present invention, the occurrences C(j)(K) of each element in the non-verified inequalities IN(i) are counted and the elements with the maximum value of C(j)(K) are selected to be the target elements.

Once the target elements have been identified, the request adjustment phase 420 provides for removing from the set of target elements an overall number of RBs equal to the maximum overflow value MOV, obtaining a new set of adjusted sub-band size requests N(j)(K). In this way, it is assured that the changes over the original sub-band size requests N(j)(K) are minimized.

Advantageously, the way such overall number of RBs equal to the maximum overflow value MOV are subtracted from the target elements depends on the value assumed by each single target element. The number Δ(j)(K) of blocks to be cut from each target element is proportional to its own value, e.g. a target element with higher N(j)(K) gets higher Δ(j)(K). The sum of Δ(j)(K) values is equal to MOV. The lowest between Δ(j)(K) and N(j)(K) is subtracted from MOV and from N(j)(K). The procedure is repeated until MOV become equal to 0

Three examples of the request adjustment phase 420 according to an embodiment of the present invention will be now disclosed. In all the examples, the cluster includes three antennas A, B, C and the total number of PRBs forming the frame is equal to Ntot=50.

Example 1

| Antenna A | | N(A)(B) = 5 | N(A)(C) = 5 | | N(A)(BC) = 11 | N(A)(0) = 5 |
|---|---|---|---|---|---|---|
| Antenna B | N(B)(A) = 15 | | N(B)(C) = 5 | N(B)(AC) = 5 | | N(B)(0) = 5 |
| Antenna C | N(C)(A) = 5 | N(C)(B) = 0 | | N(C)(AB) = 5 | | N(C)(0) = 5 |

In this case, inequalities IN(1), IN(2) and IN(3) are not satisfied, while inequality IN(4) is satisfied.

$$OV(1)=(26+25)-50=1$$

$$OV(2)=(30+21)-50=1$$

$$OV(3)=(30+21)-50=1$$

$$MOV=1$$

The target elements are N(A)(BC), N(B)(AC) and N(C)(AB).

A number of PRBs equal to MOV=1 is removed from the target elements to obtain the following adjusted sub-band size requests N(j)(K).
    adjusted N(A)(BC)=original N(A)(BC)−1=10
    adjusted N(B)(AC)=original N(B)(AC)=5
    adjusted N(C)(AB)=original N(C)(AB)=5.
The new resource allocation proposals becomes:

| | | | | | |
|---|---|---|---|---|---|
| Antenna A | N(A)(B) = 5 | N(A)(C) = 5 | | N(A)(BC) = 10 | N(A)(0) = 5 |
| Antenna B N(B)(A) = 15 | | N(B)(C) = 5 | N(B)(AC) = 5 | | N(B)(0) = 5 |
| Antenna C N(C)(A) = 5 | N(C)(B) = 0 | | N(C)(AB) = 5 | | N(C)(0) = 5 |

Now, inequalities IN(1), IN(2) and IN(3) are satisfied.

Example 2

| | | | | | |
|---|---|---|---|---|---|
| Antenna A | N(A)(B) = 5 | N(A)(C) = 0 | | N(A)(BC) = 0 | N(A)(0) = 10 |
| Antenna B N(B)(A) = 25 | | N(B)(C) = 5 | N(B)(AC) = 10 | | N(B)(0) = 0 |
| Antenna C N(C)(A) = 0 | N(C)(B) = 0 | | N(C)(AB) = 10 | | N(C)(0) = 5 |

In this case, inequalities IN(1), IN(2) and IN(4) are not satisfied, while inequality IN(3) is satisfied.

$$OV(1)=(15+45)-50=10$$

$$OV(2)=(40+15)-50=5$$

$$OV(4)=(25+5+5+10+10+0)-50=10$$

MOV=10

The target elements are N(A)(BC), N(B)(AC) and N(C)(AB), N(B)(A), N(A)(B).

A number of PRBs equal to MOV=10 is removed from the target elements to obtain the following adjusted sub-band size requests N(j)(K).
    adjusted N(A)(BC)=original N(A)(BC)=0
    adjusted N(B)(AC)=original N(B)(AC)−2=8
    adjusted N(C)(AB)=original N(C)(AB)−2=8
    adjusted N(B)(A)=original N(B)(A)−5=20
    adjusted N(A)(B)=original N(A)(B)−1=4
The new resource allocation proposals becomes:

| | | | | | |
|---|---|---|---|---|---|
| Antenna A | N(A)(B) = 4 | N(A)(C) = 0 | | N(A)(BC) = 0 | N(A)(0) = 10 |
| Antenna B N(B)(A) = 20 | | N(B)(C) = 5 | N(B)(AC) = 8 | | N(B)(0) = 0 |
| Antenna C N(C)(A) = 0 | N(C)(B) = 0 | | N(C)(AB) = 8 | | N(C)(0) = 5 |

Now, inequalities IN(1), IN(2) and IN(4) are satisfied.

Example 3

| | | | | | |
|---|---|---|---|---|---|
| Antenna A | N(A)(B) = 6 | N(A)(C) = 10 | | N(A)(BC) = 0 | N(A)(0) = 30 |
| Antenna B N(B)(A) = 5 | | N(B)(C) = 10 | N(B)(AC) = 0 | | N(B)(0) = 30 |
| Antenna C N(C)(A) = 5 | N(C)(B) = 6 | | N(C)(AB) = 10 | | N(C)(0) = 5 |

In this case, inequalities IN(1), IN(2) are not satisfied, while inequalities IN(3), IN(4) are satisfied.

$$OV(1)=(46+5)-50=1$$

$$OV(2)=(45+6)-50=1$$

MOV=1

The target elements are N(A)(BC), N(B)(AC), N(C)(AB), N(B)(A), N(A)(B).

A number of PRBs equal to MOV=1 is removed from the target elements to obtain the following adjusted sub-band size requests N(j)(K).

adjusted N(A)(BC)=original N(A)(BC)=0
adjusted N(B)(AC)=original N(B)(AC)=0
adjusted N(C)(AB)=original N(C)(AB)=0
adjusted N(B)(A)=original N(B)(A)=5
adjusted N(A)(B)=original N(A)(B)−1=5

The new resource allocation proposals becomes:

| Antenna A |              | N(A)(B) = 5 | N(A)(C) = 10 |             | N(A)(BC) = 0 | N(A)(0) = 30 |
|-----------|--------------|-------------|--------------|-------------|--------------|--------------|
| Antenna B | N(B)(A) = 5  |             | N(B)(C) = 10 | N(B)(AC) = 0 |             | N(B)(0) = 30 |
| Antenna C | N(C)(A) = 5  | N(C)(B) = 6 |              | N(C)(AB) = 0 |             | N(C)(0) = 5  |

Now, inequalities IN(1) and IN(2) are satisfied.

Once the request adjustment phase 420 has been completed, or in case the received sub-band size requests N(j)(K) were already feasible, the actual frame partition is carried out in the frame partition phase 430, setting the size of the various interference sub-bands ISB(K) of the frame starting from the sub-band size requests N(j)(K).

In this frame partition phase, if the sub-band size requests N(j)(K) allow some degree of freedom, i.e., for each antenna j of the cluster, it is possible, in the composition of the frame, to satisfy all the sub-band size requests of the antenna j and the requests of muting antenna j coming from the other antennas of the cluster, then the master unit 240 can exploit said degree of freedom to grant to the antenna j the possibility of allocating its radio resources in a way that improves the interference condition experienced by the served UE over the requests of the antenna. In doing so, the numbers of RBs globally associated to each antenna of the cluster can be kept unchanged with respect to the ones determined by the sub-band size requests N(j)(K), and only the interference conditions of the RBs are modified.

Figure 5:
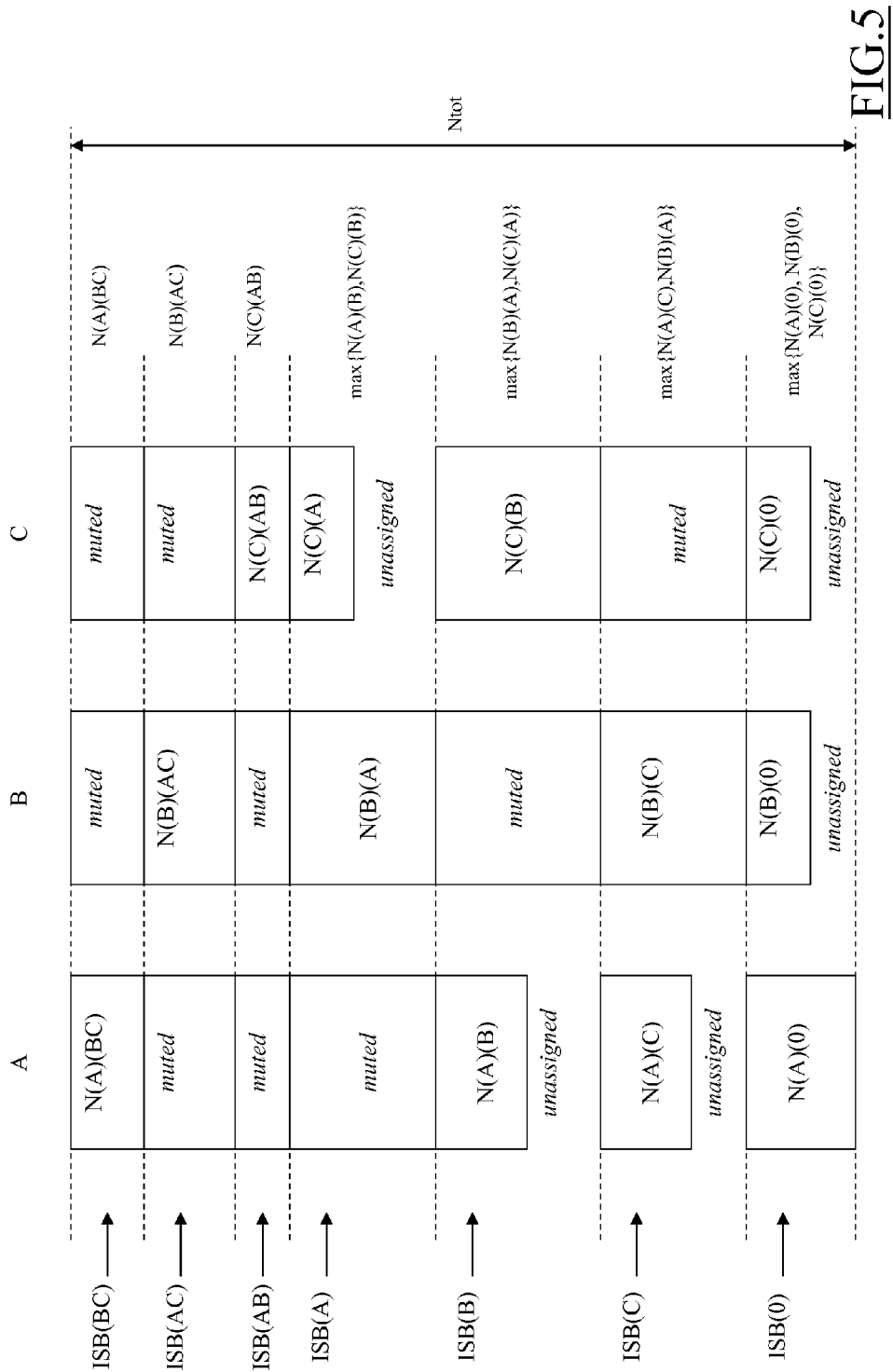
FIG. 5 illustrates an exemplary frame partition construed by directly exploiting a set of sub-band size requests N(j)(K) received by the antennas according to an embodiment of the present invention.

FIG. 5 illustrates an exemplary frame partition for a cluster of three antennas A, B, C construed by directly exploiting a set of sub-band size requests N(j)(K) received by the antennas of the cluster. Each interference sub-band ISB(K) of the frame is graphically depicted in FIG. 5 with a height that is proportional to the size thereof (in terms of number of RBs).

The sub-band size requests N(j)(K) of the exemplary case illustrated in FIG. 5 allow some degree of freedom. For example, with said sub-band size requests N(j)(K), several portions of the frame happen to be unassigned. Such unassigned portions may be either assigned to interference sub-bands ISB(K) or may be muted. Moreover, RBs belonging to a sub-band size request N(j)(K) may be moved to other interference sub-bands ISB(K). For example, RBs belonging to the sub-band size request NA(0) can be moved to the interference sub-band ISB(BC), which for the UE served by antenna A is certainly an improvement in terms of less interference.

From the example above, it is clear that, starting from a frame partition based on the sub-band size requests N(j)(K), a very huge amount of different possibilities exists to set the actual size of the various interference sub-bands ISB(K). The frame partition phase 430 according to an embodiment of the present invention provides for facing this issue as an optimization problem. The function to be optimized in said optimization problem depends on the considered scenario, such as the considered network arrangement. Considering for example the case of a cluster of three antennas A, B, C:

In the network arrangement of FIG. 1A, wherein the antennas of the cluster are distributed on different sites and insist on the same area, the frame partition should preferably prioritize the interference sub-bands ISB(K) corresponding to cluster muting conditions K in which two antennas are muted (double-muting condition), such as for example ISB(BC), over the interference sub-bands ISB(K) corresponding to cluster muting conditions K in which only one antenna is muted (single muting condition), such as for example ISB(B). Indeed, in the network arrangement of FIG. 1A, UE in communication with an antenna of the cluster may quite often be in high interference condition with respect to both the other two antennas of the cluster.

In the network arrangement of FIG. 1B, wherein the antennas of the cluster are co-located at a same site and substantially insist on separated areas, the frame partition should preferably prioritize the interference sub-bands ISB(K) corresponding to cluster muting conditions K in which a single antenna is muted (single-muting condition) over the interference sub-bands ISB (K) corresponding to cluster muting conditions K in which two antennas are muted (double-muting condition), since in the network arrangement of FIG. 1B it is difficult that an UE in communication with an antenna of the cluster is in high interference condition with respect to both the other two antennas of the cluster.

Making reference again to the case in which the cluster of antennas includes three antennas A, B, C, according to an embodiment of the present invention, the frame partition phase 430 sets the size n(K) of the interference sub-bands ISB(K) (in terms of number of RBs) to the values that solve the following optimization problem:

$$\text{Maximize}\{\alpha \cdot (n(A)+n(B)+n(C))+(n(AB)+n(BC)+n(AC))\}$$

subject to:

$$n(BC) \geq N(A)(BC) \tag{1a}$$

$$n(BC)+n(C) \geq N(A)(BC)+N(A)(C) \tag{2a}$$

$$n(BC)+n(B) \geq N(A)(BC)+N(A)(B) \tag{3a}$$

$$n(BC)+n(B)+n(C)+n(0)=N(A)(BC)+N(A)(C)+N(A)(B)+N(A)(0) \tag{4a}$$

$$n(AC) \geq N(B)(AC) \tag{1b}$$

$$n(AC)+n(C) \geq N(B)(AC)+N(B)(C) \tag{2b}$$

$$n(AC)+n(A) \geq N(B)(AC)+N(B)(A) \tag{3b}$$

$$n(AC)+n(A)+n(C)+n(0)=N(B)(AC)+N(B)(C)+N(B)(A)+N(B)(0) \tag{4b}$$

$$n(AB) \geq N(C)(AB) \tag{1c}$$

$$n(AB)+n(A) \geq N(C)(AB)+N(C)(A) \tag{2c}$$

$$n(AB)+n(B) \geq N(C)(AB)+N(C)(B) \tag{3c}$$

$$n(AB)+n(A)+n(B)+n(0)=N(C)(AB)+N(C)(C)+N(C)\\(A)+N(C)(0) \quad (4c)$$

$$n(BC)+n(AC)+n(AB)+n(B)+n(C)+n(A)+n(0) \leq N\text{tot}, \quad (5)$$

wherein:
- α is a positive parameter whose value determines if in the resulting frame partition double muting is preferred over single muting (α>1), or if single muting is preferred over double muting (α<1),
- constraints (1a)-(3a) impose that the sizes n(BC), n(B), n(C) of the interference sub-bands ISB(BC), ISB(B), ISB(C) in which the antenna A is active are higher than or equal to the sub-band size requests N(A)(K) sent by the antenna A;
- constraints (1b)-(3b) impose that the sizes n(AC), n(C), n(A) of the interference sub-bands ISB(AC), ISB(A), ISB(C) in which the antenna B is active are higher than or equal to the sub-band size requests N(B)(K) sent by the antenna B;
- constraints (1c)-(3c) impose that the sizes n(AB), n(A), n(B) of the interference sub-bands ISB(AB), ISB(A), ISB(B) in which the antenna C is active are higher than or equal to the sub-band size requests N(C)(K) sent by the antenna C;
- constraint (4a) imposes that the total number of RBs globally associated to the antenna A is kept unchanged with respect to the ones determined by the sub-band size requests N(A)(K);
- constraint (4b) imposes that the total number of RBs globally associated to the antenna B is kept unchanged with respect to the ones determined by the sub-band size requests N(B)(K);
- constraint (4c) imposes that the total number of RBs globally associated to the antenna C is kept unchanged with respect to the ones determined by the sub-band size requests N(C)(K);
- constraint (5) imposes that the sum of all the RBs associated to all the interference sub-bands IB(K) is not higher than the total number Ntot of RBs forming the frame.

This optimization problem is a Mixed Integer Linear Problem (MILP) with 7 variable and 13 linear constraints, which can be solved using known algorithms, either optimally, i.e., by using standard mathematical procedures, or euristically, e.g., by continuous relaxation of integer variables followed by integer rounding through local search. In order to reduce the computational burden, sub-optimal solutions can be computed by continuous relaxation of integer variables followed by rounding through local search.

Figure 6:
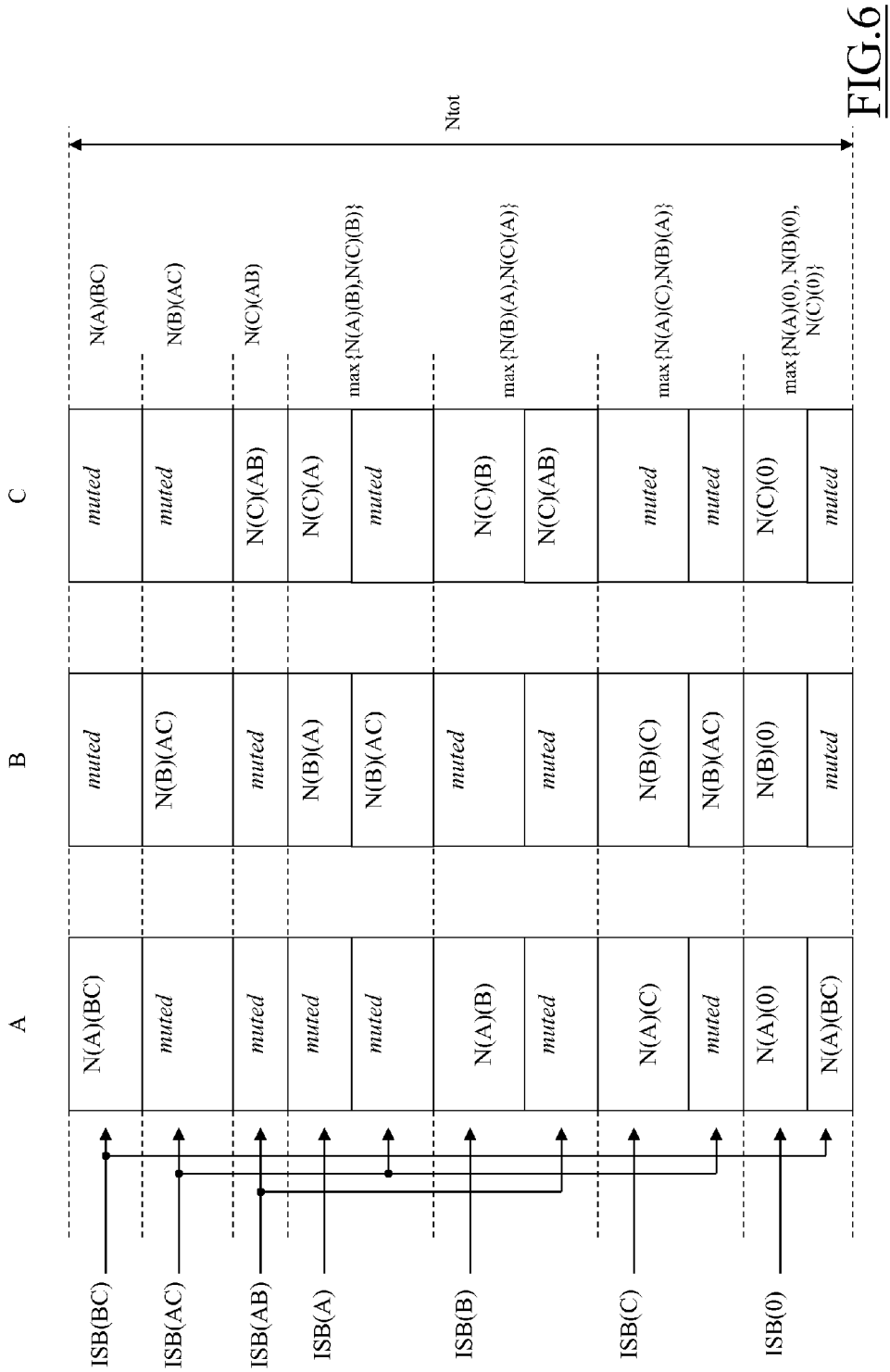
FIG. 6 illustrates an exemplary frame partition obtained by the frame partition of FIG. 5 in such a way to prioritize double-muting over single-muting according to an embodiment of the present invention.

FIG. 6 illustrates an exemplary frame partition obtained from the sub-band size requests N(j)(K) illustrated in FIG. 5 by carrying out the frame partition phase 430 in such a way to prioritize double-muting over single-muting.

Figure 7:
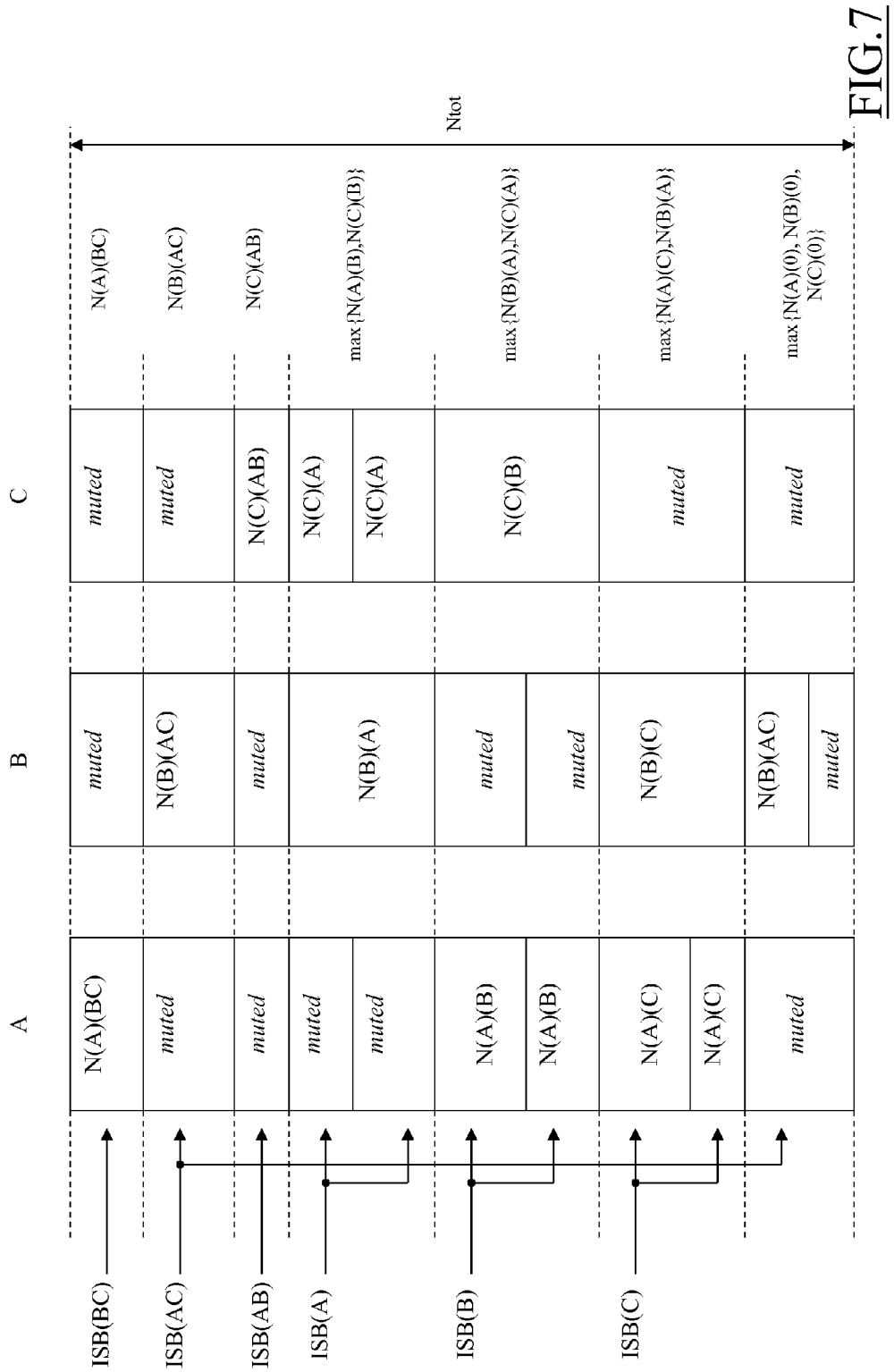
FIG. 7 illustrates an exemplary frame partition obtained by the frame partition of FIG. 5 in such a way to prioritize single-muting over double-muting according to an embodiment of the present invention.

FIG. 7 illustrates an exemplary frame partition obtained from the sub-band size requests N(j)(K) illustrated in FIG. 5 by carrying out the frame partition phase 430 in such a way to prioritize single-muting over double-muting. In this frame partition, no RBs is associated to the interference sub-band ISB(0).

Figure 8:
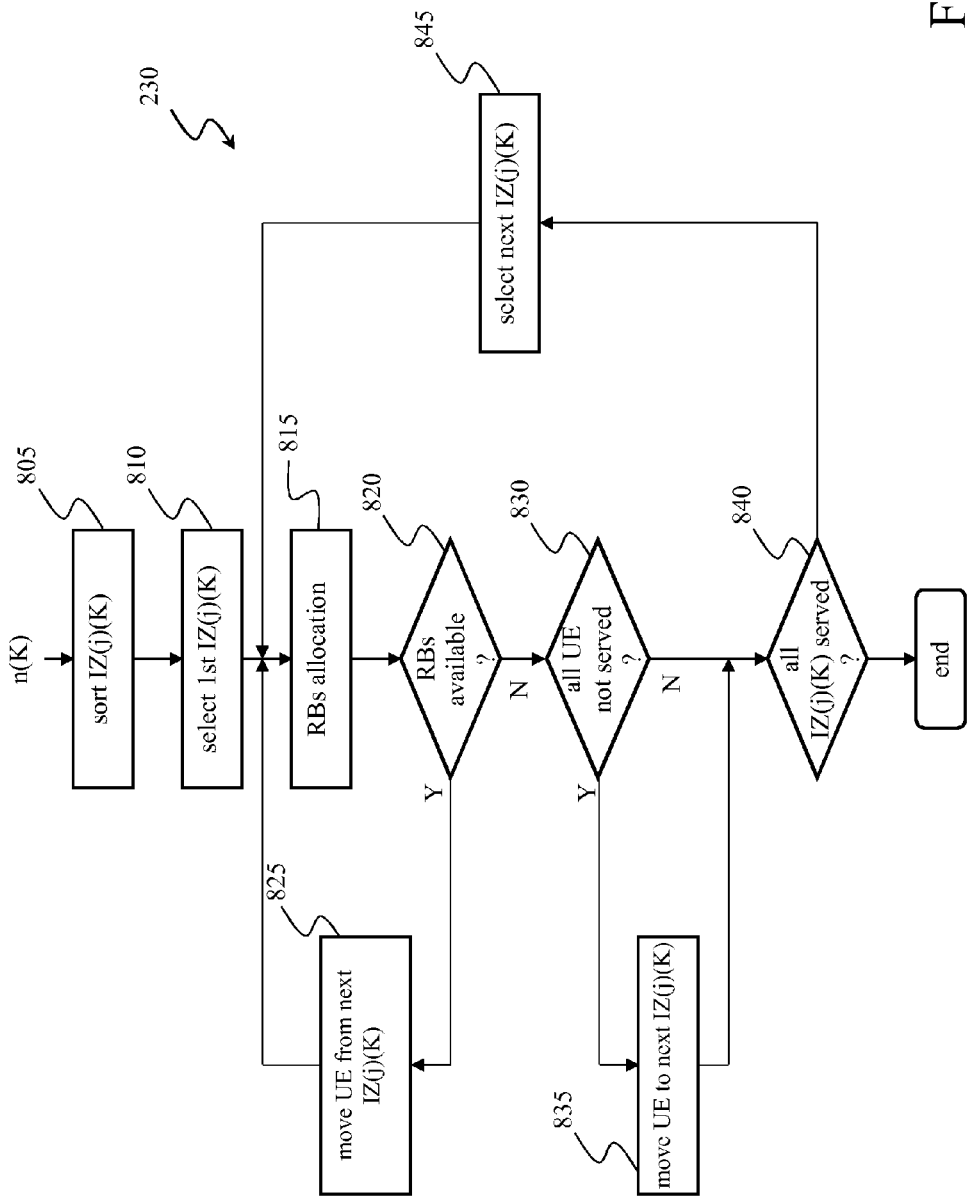
FIG. 8 illustrates in terms of functional blocks the main phases of a final allocation sub-procedure of the scheduling procedure of FIG. 2 according to an embodiment of the present invention.

FIG. 8 illustrates in terms of functional blocks the main phases of the final allocation sub-procedure 230 of the scheduling procedure 200 according to an embodiment of the present invention.

During the final allocation sub-procedure 230 each antenna j of the cluster of antennas A, B, C allocates to the UE 120 in communication therewith corresponding RBs of the frame based on the interference sub-bands ISB(K) and their sizes n(K) calculated in the frame partitioning sub-procedure 220.

The first phase (block 805) of the final allocation sub-procedure 230 provides for sorting the interference zone groups IZ(j)(K) the UE 120 in communication with the antenna j have been assigned to in an ordered sequence in which the interference zone groups IZ(j)(K) corresponding to a cluster muting condition K in which n antennas of the cluster are muted occurs before the interference zone groups IZ(j)(K) corresponding to a cluster muting condition K in which n−1 antennas of the cluster are muted. Making reference to a cluster of three antennas j=A, B, C, the interference zone groups IZ(A)(K) corresponding to the antenna A may be sorted in the following ordered sequence: IZ(A)(BC), IZ(A)(B), IZ(A)(C), IZ(A)(0).

The first interference zone group IZ(j)(K) of the ordered sequence is then selected (block 810).

At this point (block 815), the n(K) RBs of the interference sub-band ISB(K) corresponding to the selected interference zone group IZ(j)(K) are allocated to the UE 120 assigned to the selected interference zone group IZ(j)(K). The allocation is carried out by exploiting a known resource allocation algorithm, for example the one already used in block 340 of the preallocation sub-procedure 210 (e.g., PF or max C/I).

If some of the n(K) RBs of the interference sub-bands ISB(K) are still available after having served all the UE 120 assigned to the selected interference zone group IZ(j)(K) (exit branch Y of block 820), some UE 120 belonging to the next interference zone group IZ(j)(K) in the ordered sequence are moved to the currently selected interference zone group IZ(j)(K) (block 825), for being served with the remaining RBs of the interference sub-band ISB(K) (returning to block 815). The way the UE 120 belonging to the next interference zone group IZ(j)(K) in the ordered sequence are moved to the currently selected interference zone group IZ(j)(K) is carried out based on their respective gain parameter Y(K) calculated in the preallocation sub-procedure 210, for example starting from the UE 120 belonging to the next interference zone group IZ(j)(K) whose gain parameters Y(K) are closest to the lowest threshold that they have not exceeded.

When all the n(K) RBs of the interference sub-band ISB(K) are allocated (exit branch N of block 820), if some of the UE 120 assigned to the selected interference zone group IZ(j)(K) are still not served (exit branch Y of block 830), such UE 120 are moved to the next interference zone group IZ(j)(K) in the ordered sequence (block 835).

If instead all the UE 120 are served (exit branch N of block 830), or after block 835, the final allocation sub-procedure 230 provides for checking if all the UE 120 of all the interference zone groups IZ(j)(K) have been served (block 840). In the negative case (exit branch N of block 840), the next interference zone group IZ(j)(K) in the ordered sequence is selected (block 845), and the previously described operations are reiterated on such new interference zone group IZ(j)(K) (return to block 815). In the positive case (exit branch Y of block 840), the final allocation sub-procedure 230 is terminated.

The previous description presents and discusses in detail several embodiments of the present invention; nevertheless, several changes to the described embodiments, as well as different invention embodiments are possible, without departing from the scope defined by the appended claims.

The invention claimed is:

1. A method for allocating resource blocks of a transmission frame on a cellular network comprising a cluster of antennas and a master device of the cluster, wherein each antenna of the cluster is configured to provide radio coverage over a corresponding cell to exchange data with a corresponding user equipment in communication with the antennas of the cluster, and wherein during the transmission frame the antennas of the cluster are configured to be selectively activated and muted according to a plurality of cluster muting conditions, the method comprising:

each antenna of the cluster:
- a) subdividing the transmission frame into a plurality of interference sub-bands, each of the interference sub-bands corresponding to a cluster muting condition of the plurality of cluster muting conditions, and each of the interference sub-bands comprising a respective set of resource blocks of the transmission frame, and
- b) calculating a respective resource block allocation proposal providing, for each of the plurality of cluster muting conditions in which a respective antenna is active, a number of resource blocks requested by the respective antenna to be assigned to the interference sub-band corresponding to the cluster muting condition of the plurality of the cluster muting conditions;

the master device of the cluster:
- c) collecting the resource block allocation proposals of the antennas of the cluster;
- d) determining whether the resource block allocation proposals are mutually compatible within the transmission frame;
- e) adjusting the resource block allocation proposals responsive to the determination that the resource block allocation proposals are not mutually compatible within the transmission frame, the adjusting comprising reducing the number of resource blocks requested by each antenna of the cluster to be assigned to the interference sub-bands until they become mutually compatible within the transmission frame; and
- f) partitioning the transmission frame by setting the number of resource blocks of each of the interference sub-bands based on the adjusted resource block allocation proposals when the resource block allocation proposals are not mutually compatible with the transmission frame;
- g) partitioning the transmission frame by setting the number of resource blocks of each of the interference sub-bands based on the resource block allocation proposals received from the antennas of the cluster when the resource block allocation proposals are mutually compatible with the transmission frame;

each antenna of the cluster:
- h) allocating to the corresponding user equipment resource blocks of the transmission frame based on the transmission frame partitioning carried out by the master device.

2. The method of claim 1, wherein the calculating the respective resource block allocation proposal comprises calculating an amount of data the corresponding user equipment exchanges with the respective antenna in a resource block during the cluster muting of the plurality of the cluster muting conditions, and accordingly calculating the respective resource block allocation proposal based on the calculated amount of data.

3. The method of claim 2, wherein the calculating the amount of data the corresponding user equipment exchanges with the respective antenna in a resource block comprises inferring the amount of data through channel quality indicators provided by the corresponding user equipment, the channel quality indicators being indicative of communication quality of wireless channels of the cell.

4. The method of claim 1, wherein the determining whether the resource block allocation proposals are mutually compatible within the transmission frame comprises:
- verifying for each antenna of the cluster that the number of resource blocks requested by the respective antenna plus a number of resource blocks that the respective antenna cannot use, having to be muted, derived from the number of resource blocks requested by the other antennas of the cluster does not exceed a total number of resource blocks forming the frame, and
- verifying that an overall number of resource blocks that is needed for satisfying the number of resource blocks requested by each antenna of the cluster corresponding to the cluster muting conditions in which at least one of the antenna of the cluster is muted does not exceed the total number of resource blocks forming the frame.

5. The method of claim 4, wherein the partitioning the transmission frame comprises, responsive to each antenna of the cluster satisfies the respective resource block allocation proposal of the respective antenna and the number of resource blocks requested by the other antennas of the cluster corresponding to the cluster muting condition of the plurality of cluster muting conditions in which the respective antenna has to be muted, granting to the respective antenna the corresponding resource blocks for the corresponding user equipment in communication therewith over the number of resource blocks requested by the other antennas.

6. The method of claim 5, wherein the partitioning the transmission frame prioritizes the assignment of resource blocks to the interference sub-bands corresponding to cluster muting conditions in which a number of muted antennas is higher over the interference sub-bands corresponding to the cluster muting conditions in which the number of muted antennas is lower.

7. The method of claim 6, wherein the partitioning the transmission frame is carried out responsive to the cellular network is arranged so that the antennas of the cluster are distributed on different sites and are responsible for a same area.

8. The method of claim 7, wherein the cluster of antennas comprises three antennas j=A, B, C, and wherein the partitioning the transmission frame comprises maximizing $\{\alpha \cdot + n(B)+n(C))+(n(AB)+n(BC)+n(AC))\}$ subject to:

$$n(BC) \geq N(A)(BC)$$

$$n(BC)+n(C) \geq N(A)(BC)+N(A)(C)$$

$$n(BC)+n(B) \geq N(A)(BC)+N(A)(B)$$

$$n(BC)+n(B)+n(C)+n(0)=N(A)(BC)+N(A)(C)+N(A)(B)+N(A)(0)$$

$$n(AC) \geq N(B)(AC)$$

$$n(AC)+n(C) \geq N(B)(AC)+N(B)(C)$$

$$n(AC)+n(A) \geq N(B)(AC)+N(B)(A)$$

$$n(AC)+n(A)+n(C)+n(0)=N(B)(AC)+N(B)(C)+N(B)(A)+N(B)(0)$$

$$n(AB) \geq N(C)(AB)$$

$$n(AB)+n(A) \geq N(C)(AB)+N(C)(A)$$

$$n(AB)+n(B) \geq N(C)(AB)+N(C)(B)$$

$$n(AB)+n(A)+n(B)+n(0)=N(C)(AB)+N(C)(C)+N(C)(A)+N(C)(0)$$

$$n(BC)+n(AC)+n(AB)+n(B)+n(C)+n(A)+n(0) \leq N\text{tot},$$

wherein:
α is a parameter that is higher than one responsive to the partitioning is carried out according to a first point, and is lower than one responsive to the partitioning is carried out according to a second point, and
n(K) is the size, in terms of resource blocks, of the interference sub-band corresponding to the cluster muting condition K, and N(j)(K) is the size, in term of resource block, of the resource block allocation proposal requested by the antenna j to be assigned to the interference sub-band corresponding to the cluster muting condition K, wherein:
K=0 corresponds to the cluster muting condition in which all the three antennas A, B, C of the cluster are activated;
K=A corresponds to the cluster muting condition in which antenna A is deactivated, antennas B and C are activated;
K=B corresponds to the cluster muting condition in which antenna B is deactivated, antennas A and C are activated;
K=C corresponds to the cluster muting condition in which antenna C is deactivated, antennas A and B are activated;
K=AB corresponds to the cluster muting condition in which antennas A and B are deactivated, antenna C is activated;
K=BC corresponds to the cluster muting condition in which antennas B and C are deactivated, antenna A is activated;
K=AC corresponds to the cluster muting condition in which antennas A and C are deactivated, antenna B is activated.

9. The method of claim 5, wherein the partitioning the transmission frame prioritizes the assignment of resource blocks to the interference sub-bands corresponding to cluster muting conditions in which a number of muted antennas is lower over the interference sub-bands corresponding to cluster muting conditions in which the number of muted antennas is higher.

10. The method of claim 9, wherein the partitioning the transmission frame is carried out responsive to the cellular network is arranged to co-locate each antenna of the cluster at a same site and are responsible for separate areas.

11. A system for allocating resource blocks of a transmission frame on a cellular network, comprising:
a cluster of antennas, wherein each antenna of the cluster is configured to provide radio coverage over a corresponding cell, to exchange data with corresponding user equipment in communication with the antennas of the cluster, and wherein during the transmission frame the antennas of the cluster are configured to be selectively activated and muted according to a plurality of cluster muting conditions, wherein each antenna of the cluster is configured to:
a) subdivide the transmission frame into a plurality of interference sub-bands each of the interference sub-bands corresponding to a cluster muting condition of the plurality of cluster muting conditions and each of the interference sub-bands comprising a respective set of resource blocks of the transmission frame; and
b) calculate a respective resource block allocation proposal providing for each of the plurality of the cluster muting conditions in which a respective antenna is active, a number of resource blocks requested by the respective antenna to be assigned to the interference sub-band corresponding to the cluster muting condition of the plurality of cluster muting conditions;
a master node of the cluster, configured to:
c) collect the resource block allocation proposals of the antennas of the cluster;
d) determine whether the resource block allocation proposals are mutually compatible within the transmission frame;
e) adjust the resource block allocation proposals responsive to the determination that the resource block allocation proposals are not mutually compatible within the transmission frame, the adjusting comprising reducing the number of resource blocks requested by each antenna of the cluster to be assigned to the interference sub-hands until they become mutually compatible within the transmission frame;
f) partition the transmission frame by setting the number of resource blocks of each of the interference sub-bands based on the adjusted resource block allocation proposals when the resource block allocation proposals are not mutually compatible with the transmission frame; and
g) partition the transmission frame by setting the number of resource Hocks of each of the interference sub-bands based on the resource block allocation proposals received from the antennas of the cluster when the resource block allocation proposals are mutually compatible with the transmission frame, wherein
each antenna of the cluster is further configured to:
h) allocate to the corresponding user equipment corresponding resource blocks of the transmission frame based on the transmission frame partitioning carried out by the master node.

* * * * *